United States Patent
Howe et al.

[15] 3,636,696
[45] Jan. 25, 1972

[54] PROGRAMMED DRIVE SYSTEMS FOR DRAWTWISTERS

[72] Inventors: Frederick J. Howe; Mario E. Jimenez, both of Pensacola, Fla.

[73] Assignee: Monsanto Company, St. Louis, Mo.

[22] Filed: Jan. 22, 1970

[21] Appl. No.: 4,874

[52] U.S. Cl. ................................57/95, 57/97, 57/90
[51] Int. Cl. .................................................D01h 13/02
[58] Field of Search .........................57/92–95, 98–100, 57/157, 55.5

[56] References Cited

UNITED STATES PATENTS

| | | |
|---|---|---|
| 3,137,987 | 6/1964 | Potts...................................57/157 X |
| 2,763,824 | 9/1956 | Bacheler..............................57/95 X |
| 2,785,527 | 3/1957 | Lewellen et al.......................57/95 X |
| 2,803,107 | 8/1957 | Long.....................................57/95 |
| 2,952,115 | 9/1960 | Bromley................................57/92 |
| 3,407,589 | 10/1968 | Hasegawa............................57/91 |
| 3,521,441 | 7/1970 | Lamparter............................57/90 |

*Primary Examiner*—Donald E. Watkins
*Attorney*—Stanley M. Tarter, Kelly O. Corley, Neal E. Willis and Elmer J. Fischer

[57] ABSTRACT

A separate spindle-drive AC motor on a drawtwister or spinning frame. A programmed DC voltage controls an inverter for varying the speed of the separate spindle AC motor independently of the yarn speed.

7 Claims, 3 Drawing Figures

FIG. I.

INVENTORS
FREDERICK J. HOWE
MARIO E. JIMENEZ
BY
Kelly O. Corley
ATTORNEY

INVENTORS
FREDERICK J. HOWE
MARIO E. JIMENEZ
BY
*Kelly D. Corley*
ATTORNEY

PROGRAMMED DRIVE SYSTEMS FOR DRAWTWISTERS

The invention relates to a separate AC motor for driving the spindles on a drawtwister or spinning frame independently of the speed of the yarn.

It is known to separately drive the spindles on a drawtwister, to accomplish various functions. Thus Lewellen (U.S. Pat. No. 2,785,527) mechanically varies the spindle speed to control winding tension. This approach is relatively inflexible, and does not permit very accurate control of spindle speed. Potts (U.S. Pat. No. 3,137,987), by means of a clutch and gearbox, drives the spindles at either of two speeds for avoiding formation of ribbons. Since only two possible speeds are provided for, this system is likewise not very flexible. Bucher (U.S. Pat. No. 3,325,985) discloses a complex system wherein a separate motor of special design varies the spindle speed by steps. This is done by shifting the position of a brush on the separate motor with a servo mechanism. Since spindle speed is varied incrementally only, fine control cannot be achieved. Bromley (U.S. Pat. No. 3,009,308) discloses a separate motor for driving the spindle, and controlling the speed of the separate motor by varying the frequency of the AC supply for the separate motor. As disclosed in Bromley, the AC supply is derived from an alternator, which would result in the usual maintenance problems associated with such systems. In addition, it would be difficult and expensive to vary the output frequency of an alternator over a wide range with sufficient precision.

These deficiencies and others inherent in the prior art can be overcome by providing a programmed DC control voltage controlling an inverter, the output of which is supplied to the separate AC spindle motor.

A primary object of the invention is to provide a separate spindle drive system capable of accurately varying spindle speed over a wide range according to a predetermined program.

A further object is to provide a system of the above character wherein the spindle motor is an AC motor driven by a static inverter.

A further object is to provide a system of the above character wherein the inverter is controlled by a DC voltage having an amplitude varying with time in a predetermined manner.

Other objects will in part appear in part hereinafter in the following detailed disclosure together with the accompanying drawings, wherein.

Figure 1:
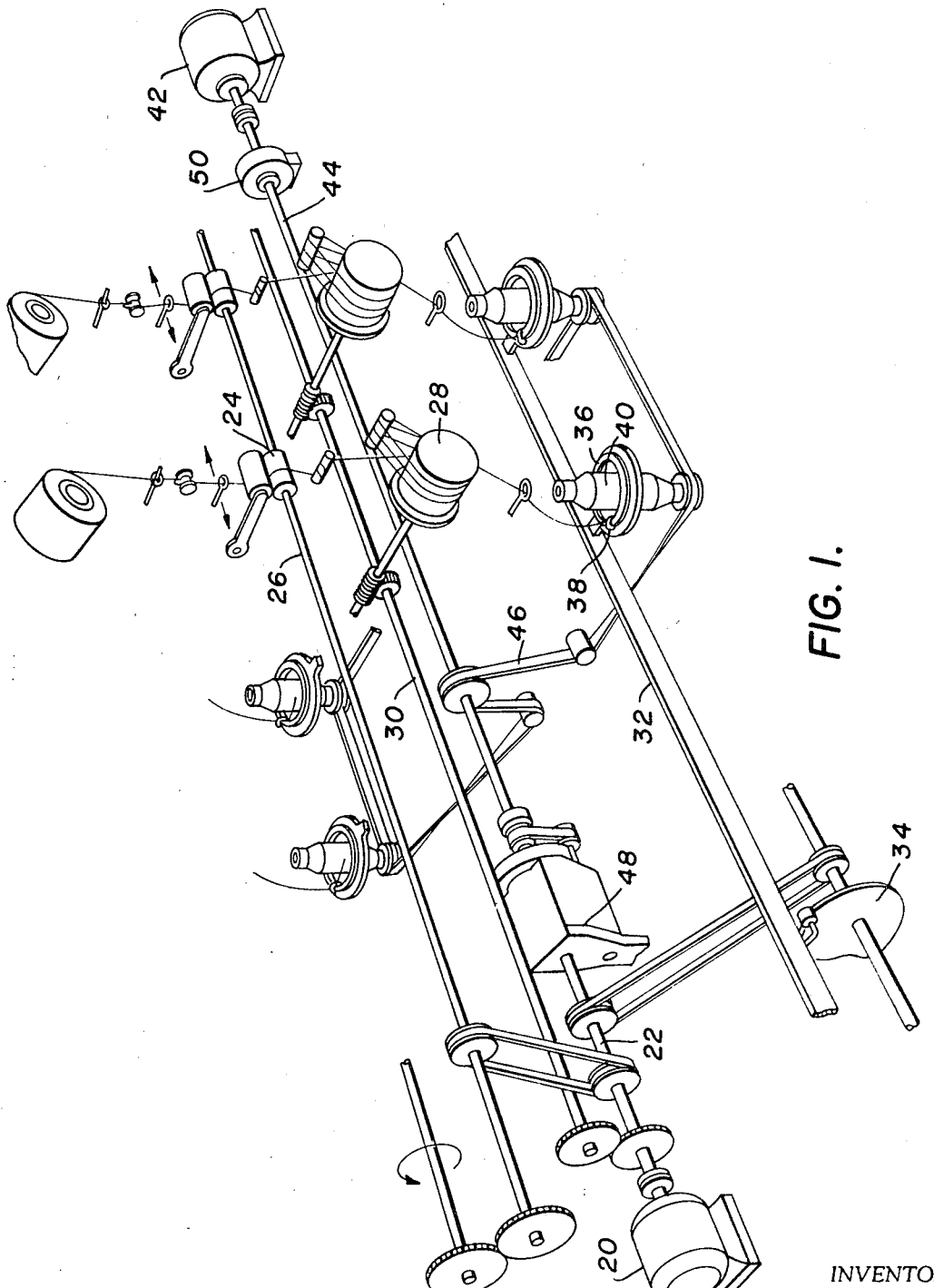
FIG. 1 is a simplified perspective view of a drawtwister incorporating the invention.

The invention is illustrated as applied to apparatus generally similar to that shown by Potts U.S. Pat. No. 3,137,987. As generally shown in FIGURE 1, motor 20 through its output shaft 22 drives yarn feed rolls 24 on shaft 26, and also drives draw rolls 28 through shaft 30. The usual lay rail 32 is reciprocated by cam 34, the cam in turn also being driven by motor 20. Lay rail 32 supports the usual rings 36 on which travelers 28 orbit, thus distributing the yarn along the surfaces of bobbins 40 under the control of cam 34.

According to the invention, the spindles on which bobbins 40 rest are driven by a separate AC motor 42 through spindle drive shaft 44 and belt 46. Overrunning clutch 48 connects main motor shaft 22 to spindle drive shaft 44 when the ratio of spindle drive shaft speed to main motor shaft speed falls below a predetermined ratio. A brake mechanism 50 is mounted to brake spindle drive shaft 44 and, through clutch 48, the remainder of the machine.

With this arrangement the spindle speed can be controlled independently of the speed of draw rolls 28, so long as the spindle speed is above some minimum value with respect to the draw roll speed. Thus, when main motor 20 is running, spindle drive shaft 44 will be driven through overrunning clutch 48 to some predetermined minimum speed. For example, the spindles may revolve at a minimum of 5,000 r.p.m. when motor 20 is running, due to coupling of shafts 22 and 44 by clutch 48. Spindle drive motor 42 can then drive spindle drive shaft 44 at a rate high enough to revolve the spindles at higher values, during which period overrunning clutch 48 will slip.

Positioning brake 50 to act on spindle drive shaft 44 permits stopping of the entire mechanism in synchronization, since clutch 48 will engage when the spindle speed drops to a sufficiently low value.

Figure 2:
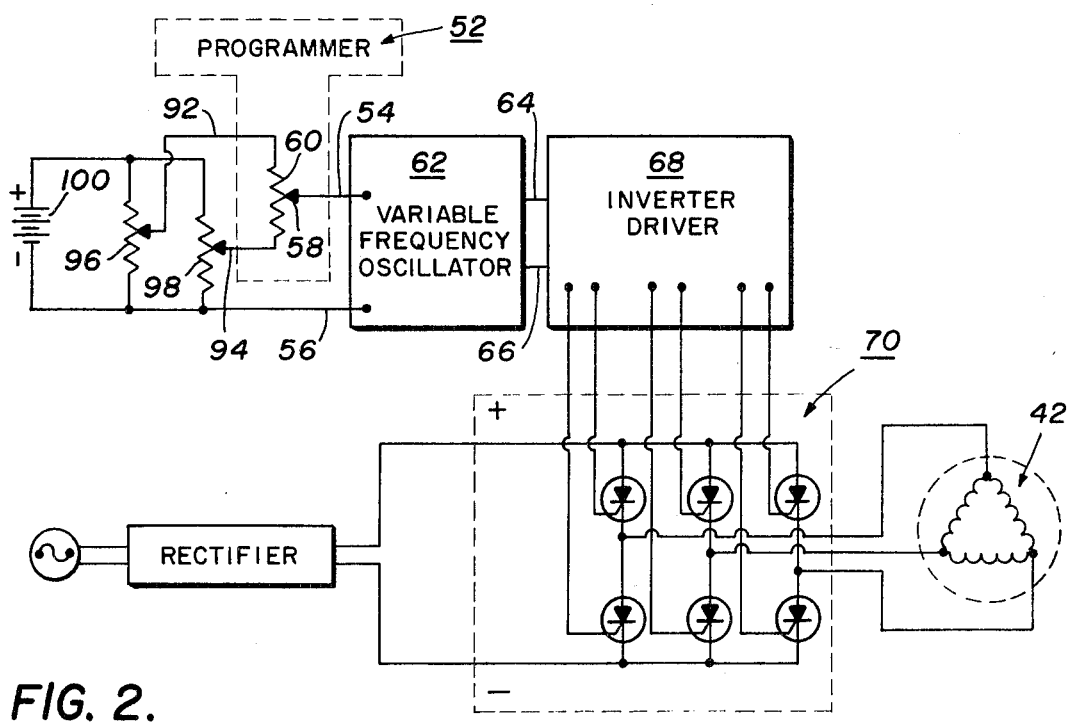
FIG. 2 is a schematic block diagram of the circuitry for driving the separate spindle motor.

Referring now to FIG. 2, there is shown the preferred and exemplary circuitry for controlling the speed of spindle motor 42, the motor being illustrated as a three-phase Δ-wound induction motor. Programmer 52 provides a controllable DC voltage between conductors 54 and 56 by moving wiper 58 on potentiometer 60. This controlled DC voltage determines the output frequency of variable frequency oscillator 62. The output signal of oscillator 62 appears on conductors 64 and 66 which feed to the input of inverter driver 68, the output of which is fed to the input of schematically illustrated inverter 70. Inverter 70 is illustrated as a three-phase inverter: the output signal from inverter 70 fed to motor 42 is accordingly one-sixteenth the frequency of the output signal of oscillator 62. Inverter 70 may include any conventional commutation means for interrupted conduction in the several SCR's. While motor 42 is illustrated as three-phase, Δ-wound, it could be of other AC construction such as single phase, two-phase, Y-wound, etc., if appropriate changes are made in inverter 70 and in inverter driver 68. Motor 42 can be synchronous or induction, or any other known type wherein the motor r.p.m. is substantially proportional to the supply frequency.

Figure 3:
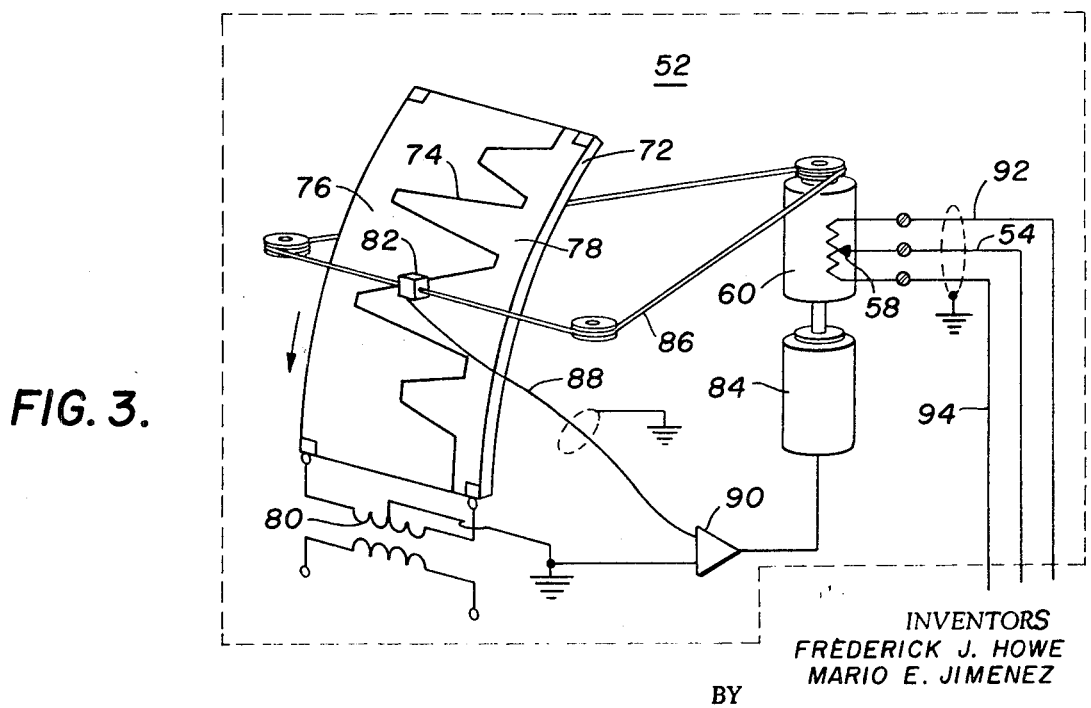
FIG. 3 is a schematic perspective view of the preferred programmer used in the FIG. 2 circuit.

The preferred programmer 52 is illustrated in FIG. 3. An insulated program card 72 has a conductive film applied to one of its large opposed surfaces. A thin line of space 74 of this conductive film is removed along the entire length of the card, thus providing electrically isolated parallel conductive elements or surfaces 76 and 78. Oppositely phased voltages are applied to surfaces 76 and 78 by transformer secondary winding 80, the center tap of which is grounded, to establish a balanced electrostatic voltage gradient across the gap constituted by line 74 between surfaces 76 and 78. An electrostatic probe 82 is slowly traversed along the length of card 72 as a function of time by a nonillustrated mechanism, while probe 82 is driven laterally by a servomotor 84 by means of appropriate pulleys and the illustrated belt 86. Probe 82 is spaced slightly from surfaces 76 and 78. The output signal from probe 82 is fed through a shielded cable 88 to amplifier 90, the output of amplifier 90 being supplied to servomotor 84. The output of amplifier 90 is phased so that probe 82 is driven by servomotor 84 to seek the zero potential existing at the center of line 74. Accordingly, probe 82 follows the contours of line 74 as probe 82 is slowly traversed along the length of card 72.

Potentiometer 60 (FIGS. 2 and 3) has its wiper 58 also driven by servomotor 84, so that the output signal on wiper 58 is determined by the displacement of line 74 on card 72.

A lower and an upper limit on the DC voltage on conductor 54 with respect to conductor 56 (and accordingly upper and lower limits on the spindle speeds) are provided by returning the end terminals 92 and 94 of potentiometer 60 to respective taps on potentiometers 96 and 98 (FIG. 2). Potentiometers 96 and 98 are connected in parallel with one another to the terminals of DC source 100. The settings of the taps of potentiometers 96 and 98 thus determine the speed range limits of the spindle motor 42 and preferably are set so that at the lower end of the range, the spindle speed is substantially equal to the speed at which the spindles would be driven by motor 20 through clutch 48. This assists in starting and stopping of the machine.

The apparatus as thus described permits precise control of spindle speed by selection of the lateral displacement of line 74. Spindle speed may thus be varied to control yarn tension throughout the winding operation, to avoid formation of ribbons, or for other functions as desired.

What is claimed is:

1. In yarn-processing apparatus wherein yarn is fed by a roll to a ring-and-traveller takeup mechanism, said mechanism including a spindle, a ring surrounding said spindle, a traveller for orbiting on said ring, and means for traversing said ring axially with respect to said spindle, the improvement comprising:
   A. means including a first drive shaft for driving said roll from a first AC motor;
   B. means including a second drive shaft for driving said spindle from a second AC motor;
   C. means for varying the speed of said second AC motor whereby the speed of said spindle can be varied independently of the speed of said roll, comprising:
      1. a frequency controlled oscillator producing on its output terminals a signal having a frequency controlled by the amplitude of an input DC control signal;
      2. an inverter driver having input terminals connected to said oscillator output terminals, and having inverter output terminals;
      3. an inverter energized from a DC power supply, said inverter having control terminals connected to said inverter driver output terminals, and having output terminals connected to said second AC motor; and
      4. control means for controlling the amplitude of said DC control signal according to a predetermined program.

2. The apparatus defined in claim 1, wherein said inverter output is three-phase AC, and wherein said second AC motor is a three-phase motor.

3. The apparatus defined in claim 1, wherein said second AC motor is an induction motor.

4. The apparatus defined in claim 1, wherein said second AC motor is a synchronous motor.

5. The apparatus defined in claim 1, wherein said control means comprises:
   A. first and second parallel conductive elements separated by a generally longitudinally extending nonconductive space;
   B. means for applying to said elements an AC signal balanced with respect to a point of reference potential;
   C. an electrostatic probe positioned near said space;
   D. amplifier means for amplifying the output signal from said probe;
   E. a servomotor driven by the output of said amplifier;
   F. means coupling said servomotor to drive said probe laterally with respect to said space, the phase of the output signal of said amplifier being such that said probe is driven toward the center of said space;
   G. means for driving said elements generally longitudinally with respect to said probe as a function of time; and
   H. a potentiometer having a movable tap driven by said servomotor.

6. In yarn-processing apparatus wherein yarn is fed by a roll to a ring-and-traveller takeup mechanism, said mechanism including a spindle, a ring surrounding said spindle, a traveller for orbiting on said ring, and means for traversing said ring axially with respect to said spindle, the improvement comprising:
   A. means including a first drive shaft for driving said roll from a first motor;
   B. means including a second drive shaft for driving said spindle from a second AC motor;
   C. means for varying the speed of said second AC motor whereby the speed of said spindle can be varied independently of the speed of said roll; and
   D. means including a clutch for coupling said first and said second drive shafts.

7. The apparatus defined in claim 6, wherein said clutch is an overrunning mechanical clutch for preventing the ratio of spindle speed to roll speed from dropping below a given value, said apparatus further comprising means for braking said second shaft whereby braking torque is transmitted to said first shaft and said roll through said clutch in synchronism with braking of said spindle.

* * * * *